April 21, 1925.
O. E. BORNHAUSER ET AL
1,534,154
APPARATUS FOR MAKING BUILDING BLOCKS AND THE LIKE
Filed Oct. 12, 1923 4 Sheets-Sheet 1
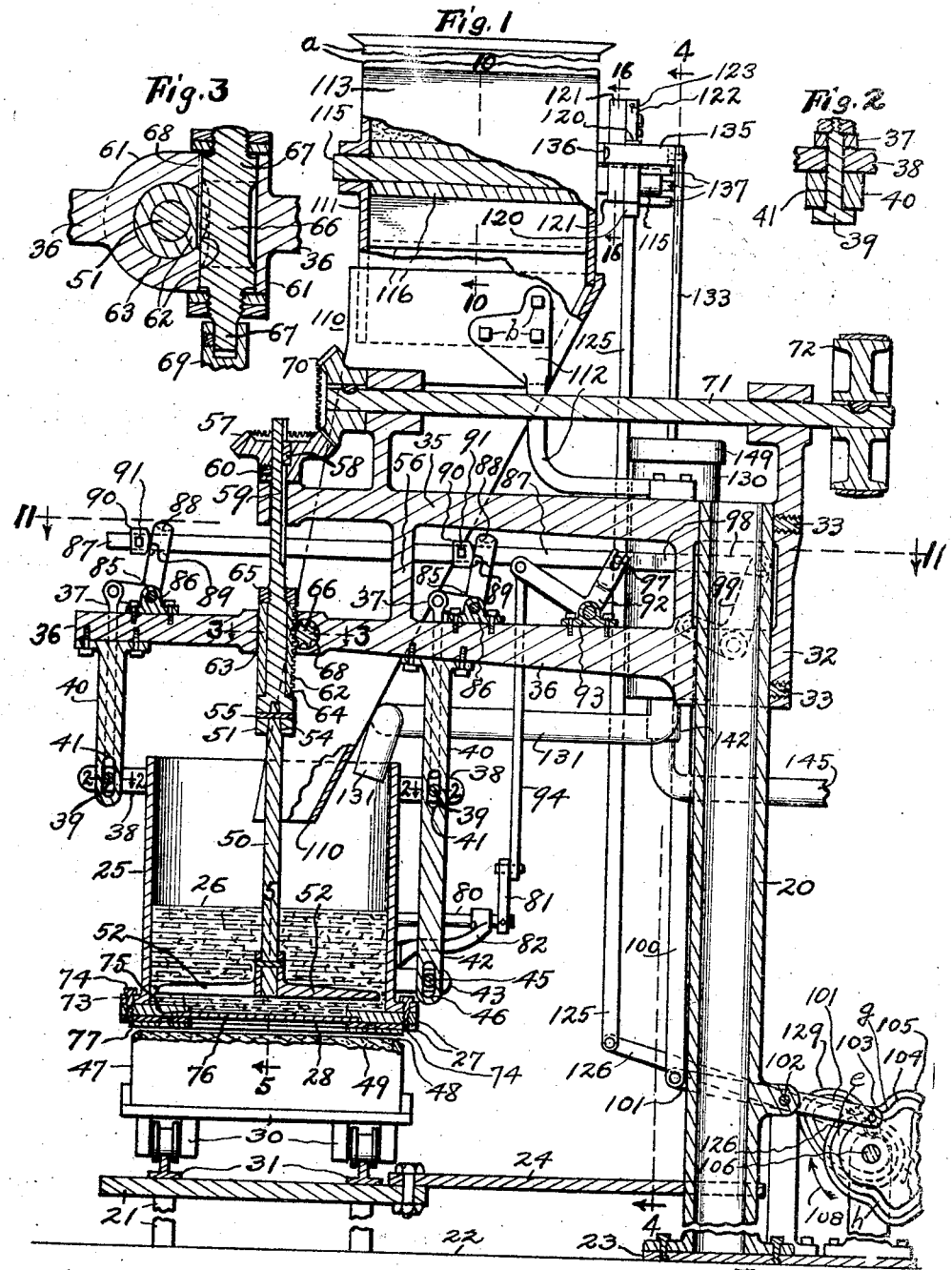

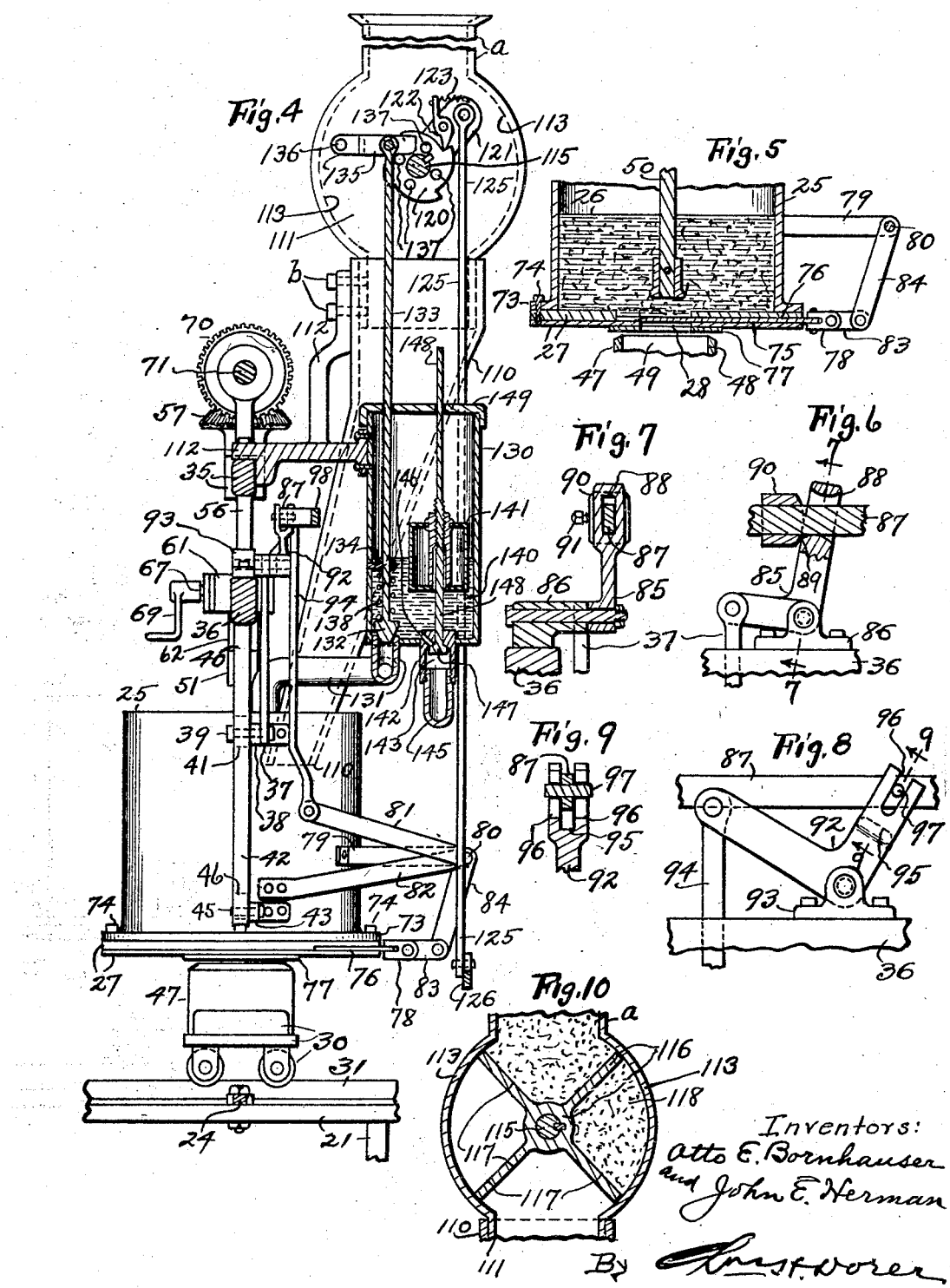

April 21, 1925.
O. E. BORNHAUSER ET AL
1,534,154
APPARATUS FOR MAKING BUILDING BLOCKS AND THE LIKE
Filed Oct. 12, 1923     4 Sheets-Sheet 3
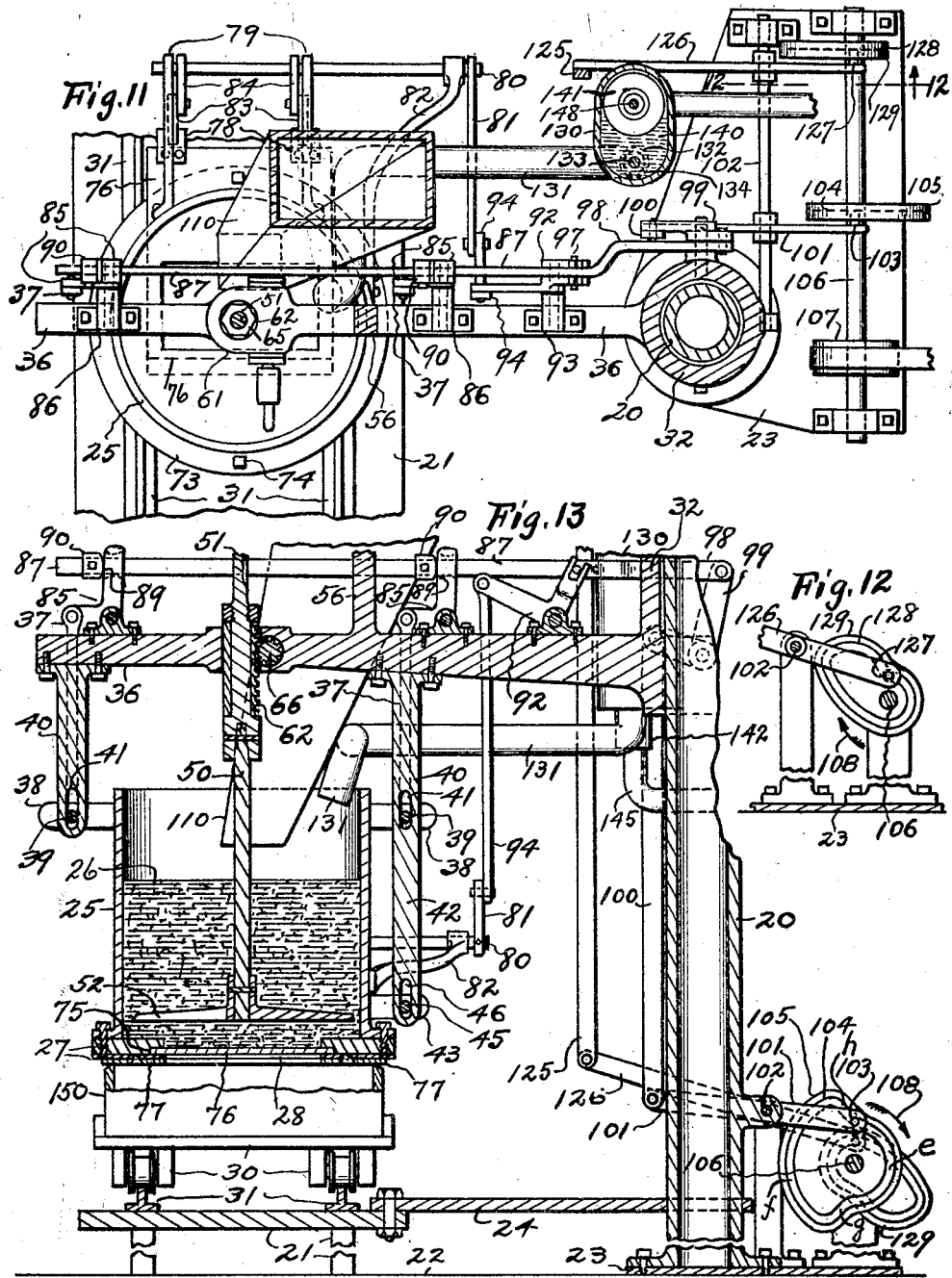
Inventors:
Otto E. Bornhauser
and John E. Herman
By their Attorney.

April 21, 1925.  
O. E. BORNHAUSER ET AL  
APPARATUS FOR MAKING BUILDING BLOCKS AND THE LIKE  
Filed Oct. 12, 1923  4 Sheets-Sheet 4
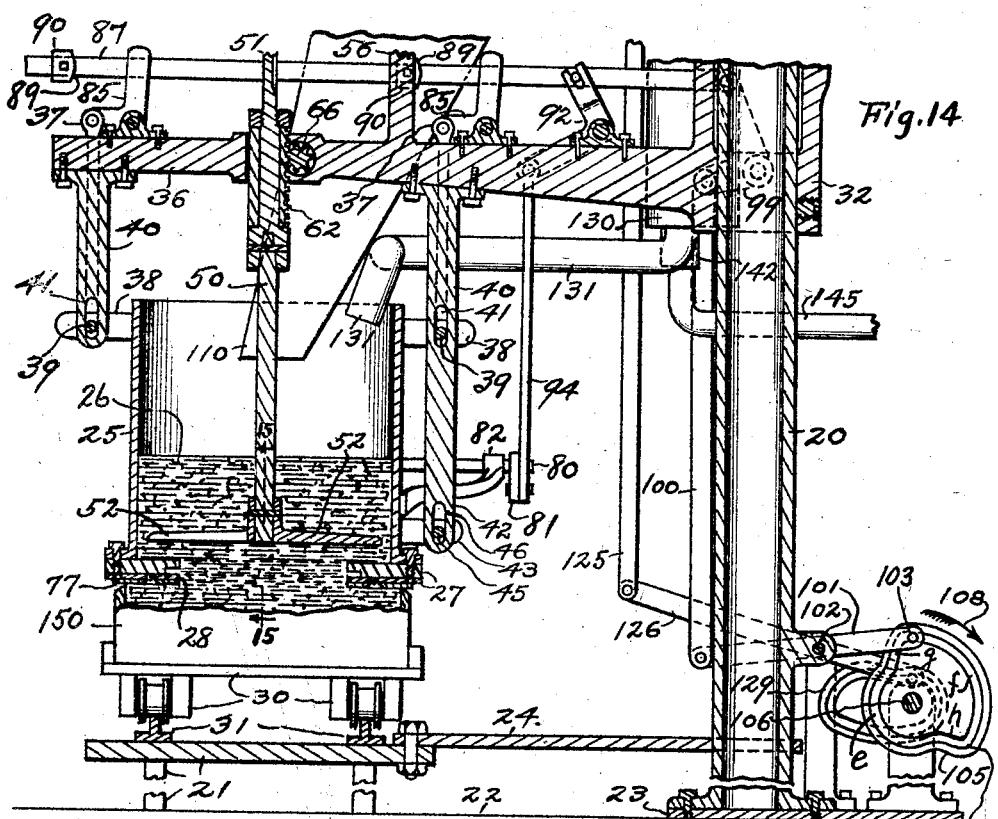
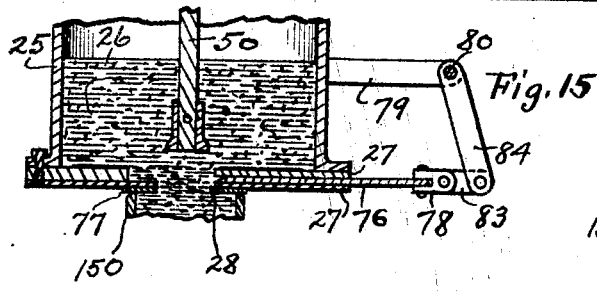
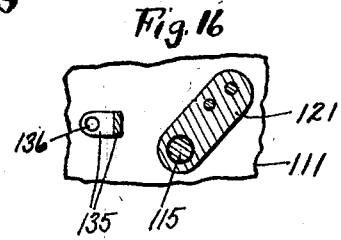
Inventors:  
Otto E. Bornhauser  
and John E. Herman  
By *[signature]*  
their Attorney.

Patented Apr. 21, 1925.

1,534,154

UNITED STATES PATENT OFFICE.

OTTO E. BORNHAUSER AND JOHN E. HERMAN, OF SANDUSKY, OHIO.

APPARATUS FOR MAKING BUILDING BLOCKS AND THE LIKE.

Application filed October 12, 1923. Serial No. 668,102.

*To all whom it may concern:*

Be it known that we, OTTO E. BORN-HAUSER and JOHN E. HERMAN, citizens of the United States, residing at Sandusky, in the county of Erie and State of Ohio, have invented a new and useful Apparatus for Making Building Blocks and the like, of which the following is a specification.

This invention relates to improvements in apparatus for making building blocks and the like, and pertains more especially to apparatus which is highly practical for making cementitious building blocks consisting, in the main, of gypsum, and comprises a substantially vertically movable mixing hopper adapted to discharge into a mold to be positioned under the hopper in the upper position of the hopper, a valve controlling the discharge from said hopper, stirring means in said hopper, a chute for intermittently feeding dry material to said hopper, means for controlling the feed of material through said chute, a conduit for intermittently feeding liquid to said hopper, and a valve controlling communication through said conduit.

The valve for controlling the discharge of material from the mixing hopper of our improved apparatus is in its closed position during the ascent and descent and in the upper position of said hopper, and one object of our invention is to hold said hopper a suitable length of time at the end of each movement thereof so that liquid and dry materials can be supplied to said hopper while the hopper is in its upper position, and so that while said hopper is in its lower position the hopper-discharge-controlling valve can be opened to permit charging of a mold positioned under the hopper and closed upon charging the mold before the next ascent of the hopper.

Another object is to provide improved and highly practical means whereby said hopper is raised and permitted to lower alternately and held a predetermined length of time at the end of each movement thereof, and to provide improved means whereby the valve controlling the discharge of material from the hopper is actuated into its fully open position upon the descent of the hopper from its upper position and closed preparatory to the next upward movement of the hopper.

Another object is to employ an endwise shiftable bar as a member of the means for operating said valve and also as a member of the mechanism for actuating the mixing hopper into its upper position during movement of said bar endwise in one direction, and to render said hopper free to descend by gravity during the fore part of the endwise movement of said bar in the opposite direction.

Another object is to supply a given measure of dry matter and a suitable quantity of liquid to the mixing hopper while the hopper-discharge-controlling valve is in its closed position between the beginning of each upward movement of said hopper and the end of the next succeeding downward movement of the hopper.

Another object is to provide improved and highly practical means whereby a rotary conveyer for delivering dry material to the hereinbefore-mentioned chute is actuated to effect the delivery of material by said conveyer and through said chute to the mixing hopper between each closing of the hopper-discharge-controlling valve and the next succeeding actuation of said valve into an open position, and furthermore to provide highly practical means whereby the valve for controlling the feed of liquid to said hopper is actuated into an open position during the operation of the aforesaid rotary conveyer.

With these objects in view, and to attain any other object hereinafter appearing, this invention consists in certain features of construction, and combinations and relative arrangements of parts, hereinafter described in this specification, pointed out in the claims, and illustrated in the accompanying drawings.

In said drawings, Figure 1 is a side elevation, largely in section, of apparatus embodying our invention and shows the hereinbefore mentioned mixing hopper in its upper position, with the valve for controlling the discharge from said hopper in its closed position, and also shows a charged mold free to be removed from under said hopper. Figs. 2 and 3 are horizontal sections, in detail, taken along the line 2—2 and line 3—3 respectively in Fig. 1. Figs. 4 and 5 are vertical sections taken along the lines 4—4 and 5—5 respectively, in Fig. 1. Fig. 6 is a side view, partly in section, showing a bell-crank and connected link employed in actuating the mixing hopper vertically and also shows the adjacent portion of the hereinbefore mentioned bar employed in actuating said bell-crank. Fig. 7 is a section taken along the line 7—7 in Fig. 6. Fig. 8 is a side view of a portion of the aforesaid bar and a bell-crank operatively connected to said bar and employed in the operation of the hereinbefore mentioned hopper-discharge-controlling valve. Fig. 9 is a section taken along the line 9—9 in Fig. 8. Fig. 10 is a vertical section taken along the line 10—10 in Fig. 1. Fig. 11 is a horizontal section taken along the line 11—11 in Fig. 1. Fig. 12 is a vertical section taken along the line 12—12 in Fig. 11. Fig. 13 is a side view, largely in section, showing a considerable portion of the apparatus illustrated in Fig. 1, but in Fig. 13 the hopper is shown as having been lowered onto an empty mold and as having received a measure of dry material from the chute and a measure of liquid from the hereinbefore mentioned liquid-feeding conduit, and the mechanism for operating the hopper-discharge-controlling valve is shown in Fig. 13 as about to begin the movement of said valve into an open position. Fig. 14 is a view substantially corresponding with Fig. 13, except that in Fig. 14 the members of the mechanism for operating the hopper-discharge-controlling valve are shown in the position they occupy upon the actuation of said valve into a fully open position, and a mold is shown charged with material from the hopper. Fig. 15 is a vertical section taken along the line 15—15 in Fig. 14 and shows the last-mentioned valve in its fully open position. Fig. 16 is a vertical section taken along the line 16—16 in Fig. 1.

Figs. 2, 3, 6, 7, 8 and 9 are drawn on a larger scale than Figs. 1, 4, 5, 10, 11, 12, 13, 14, 15 and 16, and portions are broken away in the drawings to reduce their size and to more clearly show the construction.

Our improved apparatus comprises a supporting framework or structure which (see Fig. 1) is shown as comprising a standard 20 and a platform 21 which rests on the floor and is spaced laterally from said standard, and 22 indicates the floor line. Said standard rests on and is secured to a bed-plate 23 lying on the floor and secured in place in any approved manner. Said standard and the platform 21 are tied together by a tie-bar 24. Our improved apparatus also comprises a mixing hopper 25 in which water or liquid is to be mixed with dry materials preferably consisting, in the main, of gypsum in a finely divided state, and a wet cementitious mass 26 is shown contained in said hopper. The bottom of said hopper comprises two superposed horizontal metal plates 27 applied and secured in place as will hereinafter appear, and said bottom is provided centrally with a discharge-opening 28, as shown in Figs. 1 and 5.

The hopper 25 has a limited and preferably slight vertical movement, as will hereinafter appear, and (see Figs. 1 and 4) is arranged over the platform 21 and therefore spaced laterally from the standard 20 and also spaced upwardly from said platform in the upper position of said hopper far enough to permit the interposition of a laden mold-carriage 30 between the hopper and a horizontal track 31 on said platform. The upper end portion of said standard is embraced by a sleeve 32 which (see Fig. 1) is adjustable vertically and secured to the standard in the desired adjustment by suitably applied set-screws 33. Said sleeve has two vertically spaced and substantially parallel arms 35 and 36 extending laterally of said sleeve and over the hopper 25.

The hopper 25 (see Fig. 1) is operatively connected at its upper end portion with two substantially vertical and substantially parallel rods or links 37 arranged at opposite sides respectively of said portion and externally of the hopper, and said links extend a suitable distance above said hopper and are substantially uniform in length and adapted to be operated in unison and supported as will hereinafter appear. One of the links 37 is shown arranged adjacent the standard-facing side of the hopper 25, and the other of said links is arranged at the diametrically opposite side of said hopper. Said hopper (see Figs. 1, 2 and 4) is externally provided, adjacent the lower end portion of each link 37, with a laterally and outwardly projecting arm 38 pivoted to said link preferably by a horizontal pivotal pin 39 and extending between said link and a substantially vertical rigid depending member 40 of the lower arm 36 of the sleeve 32, and said pin 39 and said arm 38 are arranged at right angles to each other, and said pin extends into a substantially vertical slot 41 formed in and extending endwise of said depending member 40. By the hereinbefore described construction it will be observed that the relative arrangement of the hopper-arms 38 and the members 40 of the supporting arm 36 is such as to prevent circumferential displacement of said hopper, and the slots 41 in said members 40 are long enough and arranged as required to permit movement of the pins 39 endwise of said slots during the requisite endwise movement of the links 37, and said pins and the side walls of said slots cooperate in guiding and steadying said hopper during vertical movement of the hopper. One depending member 40 of the supporting arm 36 (see Figs. 1 and 4) extends downwardly, as at 42, opposite the lower end portion of the hopper 25, and preferably said portion of said hopper is externally provided with a rigid arm 43 which projects laterally and outwardly from the hopper and extends opposite one side of the portion 42 of said depending member 40 and has a horizontal pin 45 which is parallel with the pivotal pins 39 and extends into a substantially vertical slot 46 which is formed in said portion 42 of said depending member 40 and in line endwise with the slot 41 in said member 40. Obviously the pin 45 and the side walls of the slot 46 cooperate in serving to guide and steady the hopper 25 during vertical movement of the hopper.

The mold-carriage 30 is mounted and movable endwise of the track 31 and adapted to be employed in carrying a mold in under and from under the hopper 25. In Figs. 1 and 2 the mold 47 last charged from said hopper is shown still in position under the hopper, and the material-receiving chamber 48 of said mold (see Fig. 1) extends to the upper extremity of the mold and is filled with a charge 49 of cementitious material received from said hopper.

Centrally of the hopper 25 (see Fig. 1) is a vertical stirring shaft comprising a lower section 50 and an upper section 51. The lower shaft-section 50 is provided, at it lower end, with laterally extending arms 52 for stirring and mixing the dry materials and water or liquid supplied to said hopper and for stirring the cementitious mass 26 in the hopper. Said lower shaft-section 50 extends above said hopper and is operatively connected above the hopper with the upper shaft-section 51. Preferably the lower shaft-section 50 has its upper end portion tapering toward its upper extremity and forced tightly into a hole 54 formed in the lower end portion of the upper shaft-section 51, and a pin 55 extends transversely of and through said shaft-sections.

The stirring shaft (50 and 51) is supported in any approved manner, and the upper shaft-section 51 extends through the arms 35 and 36 of the supporting sleeve 32, and preferably said arms are connected together and braced apart, at a point centrally between the ends of the lower arm 36, by a vertical member 56.

The upper shaft-section 51 (see Fig. 1) extends through a bevel-gear 57 resting on the arm 35 and operatively connected with said shaft-section by a feather 58 which is carried by said gear and engages a groove 59 formed in and extending longitudinally of said shaft-section and a suitable distance below said gear so as to render the stirring-shaft adjustable vertically independently of said gear, and said shaft is secured to said gear by a set-screw 60 in the desired adjustment of the shaft and supported, through the medium of said set-screw and said gear, from the arm 35. The vertical adjustability of the stirring shaft is desirable for convenience in positioning the shaft as required to place its stirring arms 52 in the desired spaced relationship to the bottom of the hopper 25.

The arm 36 of the supporting structure has its portion which extends around the upper shaft-section 51 laterally enlarged, as at 61 in Fig. 3, and said shaft-section has its portion which extends through said arm (see Fig. 1 and 3) provided with a rack 62 embracing and extending endwise of said shaft-section and extending loosely through a vertical hole 63 formed in and extending through said arm. The rack 62 preferably rests on an upwardly facing shoulder 64 formed on the lower end-portion of the upper shaft-section 51, and said rack is clamped against said shoulder by a nut 65 threaded onto said shaft-section at the upper end of the rack. Said rack 62 is in mesh with a pinion 66 formed centrally between the ends of and integral with a short horizontal shaft 67 which is arranged within a horizontal hole 68 formed in and extending laterally through the portion 61 of the supporting arm 36 and intersecting or connecting with the hole 63, and said shaft has bearing in said arm and (see also Fig. 4) is operatively provided with a crank 69 for rotating the shaft.

The hereinbefore mentioned bevel-gear 57 (see Fig. 1) meshes with a bevel-gear 70 operatively mounted on a horizontal shaft 71 supported from the sleeve 32. On the shaft 71 is operatively mounted a driving pulley 72 to which power is applied in any approved manner, and said shaft is rotated continuously during the operation of our improved apparatus so as to cause the hereinbefore mentioned stirring-shaft to be driven continuously during said operation.

The hopper 25 (see Figs. 1 and 4) is provided at its lower end with an external annular flange 73, and the superposed bottom plates 27 of said hopper are secured, preferably removably by screws 74, to said flange. Said hopper is provided at its lower end (see Figs. 1 and 5) with a substantially horizontal and radially arranged slideway 75 which is formed by and between the plates 27 in any approved manner, and said slideway extends from the discharge-opening 28 to the exterior of the hopper and is engaged by a flat cut-off or valve 76 arranged to control the feed of cementitious material through said opening and consisting of a horizontal plate which extends beyond the outer end of said slideway and externally of the hopper in the inner and closed position of the valve and rests on the lower of said plates. Preferably the lower of said plates (see Figs. 1 and 5) is provided, at and next its under side and around the lower extremity of the discharge-opening 28, with packing 77 consisting preferably of a layer of elastic and compressible material such, for instance, as rubber, and said layer is secured in place in any approved manner.

Preferably the valve 76 (see Figs. 4, 5 and 11) is provided, at its outer end, with two clips 78 spaced transversely of the valve, and the hopper-body 25 is externally provided above each clip 78 with a bracket 79 supporting a horizontal shaft 80 which is arranged transversely in relation to the path of said valve and extends beyond the hopper in the direction of the standard 20 and, at its end which is nearest said standard, has an arm or lever 81 for operating the shaft. The shaft 80 (see Figs. 1, 4 and 11) also has bearing adjacent the lever 81 in a bracket 82 projecting from and rigid with the hopper 25. To each clip 78 (see Figs. 4, 5 and 11) is pivotally connected one end of a link 83 which is operatively connected at its other end with a downwardly projecting arm 84 of the shaft 80, and the relative arrangement of the parts is such that said shaft and its arms 84 and the links 83 form members of mechanism employed in actuating the valve 76.

The links 37 (see Figs. 1 and 11) are arranged at one and the same side of the arm 36 of the supporting structure. Each link 37 is pivoted at its upper end to one arm of a bell-crank 85 supported from a member 86 rigid with the supporting arm 36. Said bell-crank has its axis substantially horizontal and at a right angle to the shaft 80 and is disposed with said arm projecting in the direction of the free end of the supporting arm 36 and has its other arm projecting upwardly.

An endwise movable substantially horizontal bar 87 (see Figs. 1, 6 and 7) extends through slots 88 formed in the upright arms of the bell-cranks 85 and is preferably always seated on the bottom of the slot 88 in the bell-crank 85 adjacent the free end of the supporting arm 36. The upright arm of each bell-crank 85 has its side, which faces in the direction in which the other arm of said bell-crank projects, arranged to be operatively engaged, during movement of the bar 87 in the opposite direction, by a shoulder 89 with which said bar is provided, and preferably said shoulder is formed on a collar 90 which is mounted on and adjustable endwise of said bar and secured in the desired adjustment to said bar by a set-screw 91. The slot 88 in the upright arm of each bell-crank 85 of course extends far enough in the direction of the upper extremity and endwise of the arm to avoid interference with a satisfactory endwise movement of the bar 87.

The supporting arm 36 (see Figs. 1, 4, 8, 9 and 11) is provided, at a point between and spaced from the standard 20 and the bell-crank 85 nearest said standard, with a bell-crank 92 which is supported from a member 93 rigid with said arm and has its axis substantially parallel with the axes of the bell-cranks 85.

The bell-crank 92 is disposed with one arm thereof projecting in the direction of the adjacent bell-crank 85 and has said arm operatively connected, through the medium of a rod or link 94, with the lever 81 of the shaft 80. The bell-crank 92 is operatively connected at its other arm with the bar 87. Said bar 87 (see Figs. 8 and 9) extends loosely through a slot 95 extending to the upper extremity and endwise of and formed in the upper end portion of the last-mentioned arm of the bell-crank 92, and each side wall of said slot has a slot 96 extending to the upper extremity and endwise of said last-mentioned arm and engaged by a pin 97 carried by said bar so that the bell-crank 92, and consequently said bar, is actuated in the one direction or the other according as the bar 87 is moved endwise in the one or the other direction.

The bar 87 (see Figs. 1, 11 and 13) has a laterally offset portion 98 which extends alongside and clear of the sleeve 32 of the supporting structure and is pivoted to the upwardly projecting arm of a bell-crank 99 which is supported from said sleeve and has its axis substantially parallel with the axes of the bell-cranks 85 and 92 and has its other arm projecting in the direction of the last-mentioned bell-cranks. The bell-crank 99 is pivoted to the upper end of an upright rod or link 100 which is pivoted at its lower end to one end of a lever 101 loosely mounted intermediately of its ends and having bearing on an axle 102 which is arranged horizontally over and supported from the plate 23 and substantially parallel with the axes of the bell-cranks 85, 92 and 99, and said lever 101 is provided at its other end with an anti-friction roller 103 engaging the groove 104 formed in a cam-wheel 105 operatively mounted on a suitably supported shaft 106 which is parallel with the axle 102 and arranged over and spaced and supported from the plate 23. The shaft 106 is operatively provided (see Fig. 11) with a driving pulley 107 adapted to be rotated in any approved manner in the direction required to rotate the cam-wheel 105 in the direction indicated by arrows 108 in Figs. 1, 12, 13 and 14.

An upright chute 110 (see Figs. 1, 4 and 11) is employed in feeding the dry materials for the cementitious mass to be prepared in the mixing hopper 25, and, as shown in Figs. 1 and 4, a stationary hopper 111 is arranged, in the main, above the chute 110 and has its upper portion $a$ kept supplied in any approved manner with dry materials desirable for use in making said cementitious mass. The hopper 111 extends at its lower end into the upper end of and discharges into the chute 110, and preferably, said chute and said hopper are secured by bolts $b$ to a bracket 112 rigid with the arm 35 of the supporting structure. Preferably the chute 110 is arranged at one side of the shaft 71 and extends from the hopper 111 downwardly into the upper end of and discharges into the mixing hopper 25.

Between its upper portion $a$ and the chute 110 the stationary hopper 111 (see Figs. 4 and 10) is enlarged laterally in opposite directions and has two opposite walls 113 which extend circumferentially of opposite sides respectively of and are spaced from and concentric in relation to a substantially horizontal shaft 115 supported from said hopper 111 and intermittently rotated as will hereinafter appear. A rotary conveyer 116 (see Figs. 1 and 10) is mounted on and operatively connected with the shaft 115 and has four corresponding peripheral compartments 117 which are spaced circumferentially of said shaft and therefore adapted to successively deliver a given quantity of dry materials to be fed by the chute 110 to the mixing hopper 25. The walls 113 of the stationary hopper 111 are arranged in close proximity to the conveyer 116 and large enough in dimensions to cover a compartment 117 of said conveyer, and 118 in Fig. 10 indicates a measure of dry materials to be conveyed by said conveyer.

The conveyer-carrying shaft 115 extends externally of the hopper 111 a suitable distance, and a ratchet-wheel 120, having four corresponding ratchet-teeth respectively extending one quarter of the distance around the axis of said wheel as shown in Fig. 4, is mounted on and operatively connected with said shaft externally of said hopper. A lever 121 (see Figs. 1, 4 and 16) is loosely mounted and has bearing on the shaft 115 between the ratchet-wheel 120 and the hopper 111. Said lever 121 is provided with a pawl 122 operatively engaging the ratchet-wheel. Said pawl is pivotally supported from the lever 121 and has its axis parallel with the shaft 115, and said lever carries a spring 123 acting to retain said pawl in engagement with the ratchet-wheel. To the pawl-carrying lever 121 is pivoted the upper end of an upright rod 125 pivoted at its lower end to one end of a lever 126 which is loosely mounted intermediate its ends and has bearing on the axle 102, and said lever 126 (see Figs. 11 and 12) is provided at the other end with an antifriction roller 127 having its axis parallel with the cam-shaft 106, and said roller engages the cam-groove 128 formed in a cam-wheel 129 operatively mounted on said shaft. The relative arrangement of the parts is such that motion is not only transmitted from the shaft 106, through the medium of the cam-wheel 129, lever 126, rod 125, pawl-bearing lever 121, ratchet-wheel 120 and shaft 115, to the conveyer 116, but that said conveyer is given one-fourth of a rotation or turn about its axis during each full rotation of said cam-wheel.

A water-supplying reservoir 130, from which a limited quantity of water is fed to the mixing hopper 25 intermittently, is arranged at one side of and spaced from the members 35 and 36 of the supporting structure and has its body rigid with the bracket 112 of said structure, as shown in Fig. 4, and said reservoir is provided at its bottom with a water-feeding pipe 131 extending into the upper end of and discharging into said hopper. Said conduit 131 therefore forms the water-outlet of said reservoir and is shown, at its upper and water-receiving end, by a vertically movable valve 132 having an upwardly extending stem 133 which extends loosely through a guide-arm 134 with which the reservoir is internally provided. Said stem 133 extends above said reservoir and is pivoted at its upper end to a substantially horizontal lever 135. As hereinbefore indicated, the rod 125 for actuating the pawl-bearing lever 121 is arranged opposite one side of the ratchet-wheel-bearing end portion of the conveyer-shaft 115, and it will be observed that the lever 135 is arranged at the opposite side of said portion of said shaft and therefore externally of the hopper 111.

The lever 135 is horizontally fulcrumed at one end, as at 136, at a point spaced laterally from the last-mentioned side of the conveyer-shaft 115 and has its axis parallel with said shaft, and said lever (see Figs. 1 and 4) extends over and is adapted to rest on one of four pins 137 which project from the outer face of and are rigid with the ratchet-wheel 126. Said pins 137 are parallel with and spaced equidistantly circumferentially of and equidistantly from the conveyer-shaft 115. The relative arrangement of the parts is such that, when the conveyer-shaft 115 is at rest between intermittent movements of the ratchet-wheel 120, one of the pins 137 is next below and in position to swing the lever 135 upwardly during the next intermittent movement of said ratchet-wheel. Preferably a coiled spring 138 is arranged under the guide-arm 134 on the valve-stem 133 and acts to retain the valve 132 in its closed position.

The liquid-containing reservoir 130 (see Fig. 4) is shown supplied with a predetermined quantity of water or liquid 140 and contains a float 141 arranged at one side of the valve-stem 133 and normally spaced upwardly from a valve-casing 142 with which the lower end of the reservoir is provided at one side of the valve-engaged end portion of the conduit 131. Said valve-casing 142 has an interior chamber 143 into which discharges a pipe 145 for supplying water under pressure, and said pipe is threaded into said casing. Said valve-casing is provided at its upper end with a port 146 extending from the valve-casing-chamber 143 and discharging into said reservoir. A valve 147 is arranged within said chamber 143 and controls communication through the port 146, and said valve is shown closed and provided with a stem 148 extending through the top of the valve-casing 142 into the reservoir 130 and through the float 141. The stem 148 is rendered rigid with the float 141 in any approved manner. The valve-stems 133 and 148 extend loosely through a cover 149 with which the reservoir 130 is provided at its upper end, and said cover serves as a guide for said stems. The relative arrangement of the parts is such that when the reservoir 130 is supplied with the desired predetermined measure of water or liquid the float 141 is in position to retain the valve 146 in its closed position shown in Fig. 4, and obviously during the feed of liquid from said reservoir to the hopper 25 said float descends with the descent of the level of the liquid in the reservoir and lowers the valve 146 into an open position so as to permit liquid to flow from the liquid-supplying pipe 145 through the valve-casing-chamber 143 and port 146 into the reservoir to restore the desired liquid-level in the reservoir.

The designing of cam-wheels for attaining predetermined operations of levers or mechanism operatively connected with said cam-wheels is too well known by those skilled in the art to require description and illustration, in detail, of the cam-wheels 105 and 129 of the hereinbefore described apparatus, further than to state that the groove 104 in the cam-wheel 105 has two portions thereof $e$ and $f$ arranged at diametrically opposite sides respectively and extending circumferentially of the shaft 106 and spaced the one portion $f$ farther from the axis of said shaft than the portion $e$. Said portions $e$ and $f$ of the groove 104 are concentric in relation to the shaft 106 and the portion $f$ extends farther circumferentially of said shaft than the portion $e$. The groove 104 has two portions $g$ and $h$ extending to the portion $e$ of said groove from opposite ends respectively of the portion $f$ of the groove, and obviously therefore the portions $g$ and $h$ diverge from opposite ends respectively of the portion $e$ of the groove toward and connect with the portion $f$ of the groove.

We would here remark that the mixing hopper 25 is preferably always supplied with enough cementitious material for charging a plurality of molds, that when the bell-cranks 85 and connected links 37 are in the position shown in Fig. 1 said mixing hopper is in its upper position and the collars 90 of the bar 87 engage the bell-cranks 85, that the cam-wheel 105, in the position shown in Fig. 1 during each turn of said cam-wheel about its axis, has the portion $e$ of its groove 104 shown as receiving the roller 103 from the portion $g$ of said groove and has therefore begun to hold the mixing hopper 25 in its upper position, and that said cam-wheel is designed as required for holding said hopper in said position during approximately one-half of said turn of said cam-wheel about its axis so that said hopper is held in its upper position long enough to permit the charged mold 47 shown in Fig. 1 to be removed and replaced by an empty mold while said hopper is held in said position, and that the bar 87 is at rest, therefore, in the upper position of the hopper.

Obviously each turn or movement of the conveyer 116 one-fourth of the distance about its axis results in the delivery of a given measure of dry materials 118 through the chute 110 into the mixing hopper 25, and the cam-wheel 129, in the position shown in Figs. 1 and 12 during each turn of said cam-wheel about its axis, is about to begin the actuation of the lever 126 as required to lower the rod 125 and thereby actuate the pawl-bearing lever 121 in the direction required to turn the ratchet-wheel 120 and connected conveyer-shaft 115 as required to deliver a measure of dry materials by said conveyor while the mixing hopper 25 is held in its upper position by the cam-wheel 105 during said turn of the cam-wheel 129 about its axis. A pin 137 of the ratchet-wheel 120 is shown in Figs. 1 and 4 as in position to swing the lever 135 upwardly during said turn of the ratchet-wheel 120, and therefore during the rotation of the conveyer 116 to empty a compartment of the conveyer the lever 135 is swung upwardly by said pin 137 the extent required to elevate the stem 133 and thereby open the valve 132 to permit liquid to flow from the reservoir 130 through the conduit 131 into the mixing hopper 25. It will be observed therefore that during the operation of our improved apparatus dry materials and liquid are supplied to said mixing hopper while the hopper is held in its upper position so that said hopper, upon each descent thereof, as shown in Fig. 13, will contain enough cementitious material for charging several molds.

The charged mold 47 shown in Fig. 1 is replaced by an empty mold while the mixing hopper 25 is held in its upper position and, when the cam-wheel 105 has turned about its axis from the position shown in Fig. 1 the distance indicated in Fig. 13, the roller 103 of the lever 101 has entered the portion $h$ of the groove 104 in said cam-wheel and thereby resulted in having begun the required actuation of the mechanism comprising said cam-wheel, the lever 101, the link 100 and the bell-crank 99, for effecting the stroke or movement of the bar 87 from its one extreme position shown in Fig. 1 into its other extreme position shown in Fig. 14, and obviously, as said bar 87 has its shoulders 89 spaced from the bell-cranks 85 in the last-mentioned position of said bar, said movement of said bar permits the descent of said hopper during the fore part of said movement of the bar. The hopper 25 is in such proximity to although spaced from a mold placed under said hopper in the upper position of the hopper as to require only a slight travel of said bar in the direction required to permit descent of the hopper by gravity onto a mold 150 shown empty and placed under said hopper in Fig. 13 which shows said bar at the moment of the seating of said hopper on said mold while the shoulders 89 still engage the bell-cranks 85. The relative arrangement of the parts is such that, during movement of the bar 87 to the extent indicated in Fig. 13 from the position shown in Fig. 1, the link 94 will have lowered substantially correspondingly with the descent of the mixing-hopper 25 onto the empty mold, so that during said descent of said hopper is avoided the operation of the shaft 80 at least to the extent required to begin opening of the valve 76, and the relative arrangement of the parts is furthermore such that, upon the lowering of said hopper and said link, as shown in Fig. 13, during the stroke or movement of the bar 87 into the position shown in Fig. 14, occurs the transmission of motion from said bar to said shaft, and said valve has been actuated into its fully open position, shown in Fig. 15, upon the completion of said movement of said bar. Upon actuation of the bar 87 into the position shown in Fig. 14 the roller 103 of the lever 101 enters the portion $f$ of the groove 104 in the cam-wheel 105 so that, upon the opening of the valve 76 in the lower position of the hopper 25, said bar and said hopper are at rest long enough for an adequate charge, as shown in Figs. 14 and 15, of the mold 150. Obviously the movement of the bar 87 from its one extreme position shown in Fig. 14 into its other extreme position shown in Fig. 1 occurs while the roller 103 of the lever 101 is engaged by the portion $g$ of said groove 104 during the operation of the cam-wheel 105, and obviously during said movement of said bar occurs, first, the closing of the valve 76 and thereupon the actuation of the hopper 25 into its upper position.

What we claim is—

1. In apparatus for making cementitious building blocks and the like, the combination, with a substantially horizontally movable mold having its material-receiving chamber extending to the top of the mold, a hopper for supplying wet or moist cementitious material to said chamber, said hopper being arranged over and movable from and toward the path of said mold and having an outlet arranged to discharge into said chamber when the mold is in its material-receiving position, and a valve controlling communication through said outlet, of an actuating member movable intermittently and in opposite directions alternately, means for operating said actuating member, and means whereby the aforesaid hopper is actuated into its upper position during movement of said actuating member into its extreme position in one direction, said hopper being free to descend by gravity and adapted to seat on said mold during movement of said actuating member from said extreme position into its extreme position in the opposite direction.

2. Apparatus of the character indicated comprising a mixing hopper movable downwardly and upwardly alternately and having an outlet at its lower end for discharging into a mold that may be positioned under said hopper preliminary to each descent of said hopper into its lower position, a valve controlling communication through said outlet, an endwise movable bar, means whereby said bar may be actuated endwise in opposite directions alternately and rested at the end of each stroke or movement of the bar, and means whereby the aforesaid hopper is actuated into its upper position during movement of said bar endwise into one extreme position, said hopper being free to descend by gravity during the fore part of the endwise movement of said bar from said extreme position into its other extreme position.

3. Apparatus of the character indicated comprising a hopper movable downwardly and upwardly alternately and having a bottom which has an opening for discharging into a mold, a valve controlling communication through said opening, a substantially horizontally arranged movable bar, means whereby said bar may be actuated in opposite directions alternately and rested at the end of each stroke or movement of the bar, and means whereby said hopper is actuated into its upper position during movement of said bar in one direction, said hopper being free to descend during movement of said bar in the opposite direction.

4. Apparatus of the character indicated comprising a hopper movable downwardly and upwardly alternately and having an outlet arranged to discharge into a mold that may be under said hopper upon each descent of the hopper, a valve controlling communication through said outlet and closed in the upper position and during movement of the hopper, an endwise movable bar, means whereby said bar may be actuated endwise and rested at the end of each movement thereof, means whereby the aforesaid hopper is actuated into its upper position during movement of said bar in one direction, said hopper being free to descend from its upper position during the fore part of the movement of said bar in the opposite direction, and means whereby the aforesaid valve is actuated to begin to open upon each descent of said hopper and fully opened during the last-mentioned movement of said bar upon said descent of said hopper and closed before the ascent of said hopper during the next movement of the bar in the first-mentioned direction.

5. Apparatus of the character indicated comprising a hopper movable downwardly and upwardly alternately and adapted to discharge into a mold, a valve controlling the discharge from said hopper, an endwise movable bar having spaced shoulders facing endwise of the bar in one and the same direction, means for actuating said bar, levers operatively connected with the aforesaid hopper and engaged by the aforesaid shoulders when said bar has been actuated into its extreme position in one direction, said hopper being held in its upper position by the engagement of said shoulders with said levers upon movement of said bar into said extreme position and free to descend during the fore part of the movement of the bar in the opposite direction.

6. Apparatus of the character indicated comprising a substantially vertically movable hopper having an opening at its lower end for discharging into a mold, a valve controlling the discharge from said hopper, a substantially horizontal endwise movable bar having spaced shoulders facing endwise of the bar in one and the same direction, means for actuating said bar, levers operatively connected with said hopper and engaged by the aforesaid shoulders when said bar has been actuated into its extreme position in the aforesaid direction, said hopper being in its upper position upon movement of said bar into said extreme position and held in said upper position by the engagement of said shoulders with said levers and free to descend during the fore part of the movement of said bar in the opposite direction, and said levers being disengaged by said shoulders during the remainder of the last-mentioned movement of said bar upon said descent of the hopper to permit opening of the aforesaid valve during said remainder of said last-mentioned movement of said bar.

7. In apparatus of the character indicated, the combination, with a hopper movable downwardly and upwardly alternately and adapted to feed cementitious material into a mold, a valve controlling the discharge from said hopper and closed in the upper position and during movement of the hopper, an endwise movable bar, means whereby said bar may be actuated endwise and rested at the end of each movement of the bar, and means whereby the aforesaid hopper is actuated into its upper position during movement of said bar into one extreme position, said hopper being free to descend during the fore part of the movement of said bar from said extreme position into its other extreme position, of mechanism operatively connected with said bar whereby the aforesaid valve is actuated into an open position by and during the last-mentioned movement of said bar upon the descent of said hopper and closed before the next ascent of the hopper.

8. In apparatus of the character indicated, the combination, with a hopper movable downwardly and upwardly alternately and adapted to discharge into a mold, a valve which controls the discharge from and is supported by said hopper, an endwise movable bar, means for actuating said bar, and means whereby the aforesaid hopper is actuated into its upper position during movement of said bar in one direction, said hopper being free to descend during the fore part of the movement of said bar in the opposite direction, of an upright endwise movable rod or link operatively connected with said bar and in its upper position when the hopper is in its upper position and arranged to lower while the hopper descends during the last-mentioned movement of said bar and adapted to lower still farther upon said descent of said hopper, and means whereby the aforesaid valve is actuated into an open position by and during the descent of said link upon the descent of said hopper and closed before the ascent of said hopper during the next movement of the bar in the first-mentioned direction.

9. In apparatus of the character indicated, the combination, with a hopper movable downwardly and upwardly alternately and adapted to feed material to a mold, a valve which controls the discharge from and is supported by said hopper, an endwise movable bar, means for actuating said bar, means whereby the aforesaid hopper is actuated into its upper position during movement of said bar in one direction, said hopper being free to descend during the fore part of the movement of said bar in the opposite direction, of a bell-crank having one arm thereof connected to said bar, an endwise movable rod or link connected to the other arm of said bell-crank and arranged at one end of its range of movement when the hopper is in its upper position and movable in the direction of the other end of said range of movement during the last-mentioned movement of said bar and capable of farther movement in said direction upon said descent of said hopper, and means whereby the aforesaid valve is actuated into an open position by and during said farther movement of said link and closed before the next ascent of said hopper.

10. Apparatus of the character indicated comprising a hopper movable downwardly and upwardly alternately and adapted to discharge into a mold, a valve controlling the discharge from said hopper, and endwise movable bar having two spaced collars which are secured to and adjustable endwise of the bar and form shoulders facing endwise of the bar in one and the same direction, means for actuating said bar, and two levers operatively connected with the aforesaid hopper and engaged the one by the shoulder formed by one of said collars and the other by the shoulder formed by the other of said collars when said bar has been actuated into its extreme position in the direction in which said shoulders face, said hopper being in its upper position upon movement of said bar into said extreme position and free to descend before the end of and during the movement of said bar in the opposite direction.

11. Apparatus of the character indicated comprising a hopper movable downwardly and upwardly alternately and adapted to discharge into a mold, a valve controlling the discharge from said hopper, two links at opposite sides respectively of and connected to and extending above said hopper, a substantially horizontal endwise movable bar arranged above said hopper and having two spaced shoulders facing endwise of the bar in one and the same direction, means for actuating said bar, a supporting structure, two spaced bell-cranks supported from said supporting structure and arranged adjacent the different aforesaid links respectively, one arm of each bell-crank being connected to the adjacent link, the other arm of said bell-crank having a slot extending endwise thereof and through the arm endwise of the aforesaid bar, said bar extending through said slot, the slotted arms of the bell-cranks being arranged to be engaged by the aforesaid shoulders at the end of the movement of said bar in the aforesaid direction, and the aforesaid hopper being free to descend during movement of said bar in the opposite direction.

12. Apparatus of the character indicated comprising a substantially vertically movable hopper for feeding material to a mold, a valve controlling the discharge from said hopper, two endwise movable links arranged at opposite sides respectively and externally of and extending above and operatively connected with said hopper, a supporting structure, and means supported from said supporting structure and employed in actuating the aforesaid links in unison.

13. Apparatus of the character indicated comprising a hopper movable downwardly and upwardly alternately and adapted to discharge into a mold, a valve controlling the discharge from said hopper, two upright links at opposite sides respectively and externally of said hopper, a supporting structure comprising two rigid guide-members adjacent the different links respectively, means supported from said supporting structure and employed in actuating said links in unison, the aforesaid hopper having two arms adjacent the different links respectively, and pivotal pins connecting the hopper-arms to said links, the aforesaid guide-members having slots which are engaged by said pins and arranged to permit endwise movement of said links, and said guide-members and the aforesaid hopper-arms being arranged to cooperate in preventing circumferential displacement of the hopper.

14. Apparatus of the character indicated comprising a substantially vertically movable hopper adapted to discharge into a mold, a valve controlling the discharge from said hopper, two upright links at opposite sides respectively of said hopper, a supporting structure comprising two guide-members adjacent the different links respectively, means for actuating said links in unison, the aforesaid hopper having two arms adjacent the different links respectively, and substantially horizontal pivotal pins connecting the hopper-arms to the links, the aforesaid guide-members having slots which are engaged by said pins and arranged to permit endwise movement of the links, one slotted guide-member extending downwardly below the adjacent link, the aforesaid hopper having an external arm which overlaps the lower end portion of the last-mentioned guide-member and has a substantially horizontal pin, and said portion of said last-mentioned guide-member having a slot which is engaged by the last-mentioned pin and arranged to permit vertical movement of said hopper.

15. Apparatus of the character indicated comprising a supporting structure, a hopper movable downwardly and upwardly alternately and adapted to feed material to a mold, a valve controlling the discharge from said hopper, a shaft, means whereby during the operation of said shaft said hopper is raised and permitted to lower alternately and held at rest at the end of each movement thereof, and mechanism for actuating the aforesaid valve, said mechanism being operatively connected with the aforesaid shaft and adapted to actuate the aforesaid valve into an open position upon each descent of the hopper and to close said valve before the next upward movement of the hopper.

16. Apparatus of the character indicated comprising a hopper movable downwardly and upwardly alternately and adapted to discharge into a mold, a supporting structure having a portion thereof extending over and spaced upwardly from said hopper, a valve controlling the discharge from said hopper, means whereby said hopper may be raised and permitted to lower alternately, means for operating the aforesaid valve, an upright stirring shaft extending into and above the aforesaid hopper and supported from the aforesaid portion of the aforesaid supporting structure, and means for rotating said shaft, said shaft having stirring arms in the lower portion of the hopper and being adjustable vertically to vary the spaced relationship between the bottom of the hopper and said arms.

17. Apparatus of the character indicated comprising a substantially vertically movable hopper adapted to discharge into a mold in the lower position of the hopper, a valve controlling the discharge from said hopper, a supporting structure having a portion thereof extending over said hopper, and mechanism comprising members supported from said portion of said supporting structure and employed in actuating said hopper, said portion of supporting structure being adjustable vertically.

18. Apparatus of the character indicated comprising a hopper movable downwardly and upwardly alternately and adapted to feed material to a mold, a valve controlling the discharge from said hopper, a shaft employed in the actuation of said hopper, mechanism whereby said hopper is raised and permitted to lower alternately and held at rest at the end of each movement thereof during the operation of said shaft, a chute discharging into and extending above said hopper, an intermittently actuated conveyer arranged to deliver dry material to said chute during each actuation of said conveyer, and conveyer-actuating-mechanism employed in transmitting motion intermittently to said conveyer from the aforesaid shaft and having its operation timed to effect the delivery of material by said conveyer in the upper position of the hopper.

19. Apparatus of the character indicated comprising a hopper movable downwardly and upwardly alternately and adapted to feed material to a mold, a valve controlling the discharge from said hopper, a shaft employed in the actuation of said hopper, mechanism whereby said hopper is raised and permitted to lower alternately and held at rest at the end of each movement thereof during the operation of said shaft, a chute discharging into said hopper, an intermittently actuated conveyer arranged to deliver dry material to said chute during each actuation of said conveyer, conveyer-actuating-mechanism employed in transmitting motion intermittently to said conveyer from the aforesaid shaft and having its operation timed to effect the delivery of material by said conveyer in the interval of time between the beginning of each ascent and the end of the next descent of said hopper, a conduit for intermittently feeding liquid to said hopper, means for supplying liquid to said conduit, a valve controlling communication through said conduit and closed between successive actuations of the aforesaid conveyer, and means whereby the last-mentioned valve is opened by and during the actuation of the aforesaid conveyer-actuating-mechanism.

20. Apparatus of the character indicated comprising a hopper movable downwardly and upwardly alternately and adapted to feed material to a mold, a valve controlling the discharge from said hopper, a shaft, mechanism whereby said hopper is raised and permitted to lower alternately and held at rest at the end of each movement thereof during each complete rotation of said shaft, a chute discharging into and extending above said hopper, a rotary conveyer arranged to deliver dry material to said chute during each turn of said conveyer one fourth of the distance about its axis, conveyer-actuating-mechanism employed in transmitting motion intermittently to said conveyer from the aforesaid shaft and having its operation timed to effect the delivery of material by said conveyer only in the upper position of said hopper, a conduit for feeding liquid to said hopper, means for supplying liquid to said conduit, a valve controlling communication through said conduit and closed between successive actuations of the aforesaid conveyer, and means whereby the last-mentioned valve is opened by and during the actuation of the aforesaid conveyer-actuating-mechanism.

21. Apparatus of the character indicated comprising an endwise movable bar, a shaft operatively connected with said bar, a hopper movable downwardly and upwardly alternately and free to descend during the fore part of movement of said bar in one direction, means whereby said hopper is actuated into its upper position during movement of said bar in the opposite direction, a valve controlling the discharge from said hopper and arranged in its closed position in the upper position and during movement of said hopper, means whereby said valve is actuated into an open position during movement of the aforesaid bar in the first-mentioned direction upon the descent of said hopper, a chute discharging into said hopper, an intermittently actuated conveyer arranged to deliver dry material to said chute, conveyer-actuating-mechanism for transmitting motion intermittently to said conveyer from the aforesaid shaft, a conduit for feeding liquid to said hopper, means for supplying liquid to said conduit, a valve controlling communication through said conduit and closed between successive actuations of the aforesaid conveyer, and means whereby the last-mentioned valve is opened by and during the actuation of the aforesaid conveyer-actuating-mechanism.

In testimony whereof, we sign the foregoing specification.

OTTO E. BORNHAUSER.
JOHN E. HERMAN.